Sept. 10, 1968  N. R. KUZEL ET AL  3,401,087

METHOD FOR CONDUCTING MICROBIOLOGICAL DIFFUSION ASSAYS

Filed Feb. 16, 1966

INVENTORS
NORBERT R. KUZEL
HENRY F. COFFEY

BY

ATTORNEY

United States Patent Office 3,401,087
Patented Sept. 10, 1968

3,401,087
METHOD FOR CONDUCTING MICROBIOLOGICAL DIFFUSION ASSAYS
Norbert R. Kuzel and Henry F. Coffey, Indianapolis, Ind., assignors to Eli Lilly and Company, Indianapolis, Ind., a corporation of Indiana
Filed Feb. 16, 1966, Ser. No. 527,939
6 Claims. (Cl. 195—103.5)

This invention relates to a method for performing microbiological assays and, in particular, to a method which is adaptable to an automated system.

Microbiological assays have been performed for many years; and, in general, their purpose is to determine the activity of a substance as well as the extent of its activity. Some of the most widely tested substances are antibiotics and vitamins.

A solution of the antibiotic or other substance to be tested is usually placed in contact with an inoculated nutrient. One such nutrient may be agar inoculated with a suitable organism selected for the test. After a predetermined amount of time a zone may be formed as a result of a combination of organism growth and diffusion of the test material into the agar. These zones may display inhibition or enhancement of the general growth of the organism on the plate. Provided other parameters are held constant, the size of the zone is a function of the concentration of the active materials in the test solution. The measurement of these zones is carried out to fractions of a millimeter; and, therefore, the whole testing procedure must be performed with a high degree of care.

Two of the most widely known methods for testing such substances may be referred to as those methods using hollow cylindrical devices containing a solution to be tested and absorbent pads containing the solution. In the first instance, the hollow cylindrical device, which may be in the form of a short segment of stainless steel tubing, is placed on a petri dish containing a layer of inoculated agar. A solution of the substance to be tested is then placed inside the cylinder and allowed to diffuse into the agar.

The second generally known method uses absorbent pads or discs. These pads or discs are placed on the inoculated nutrient and then a measured volume of the test solution is transferred to them. Zones may again be formed as in the case of the hollow cylindrical devices. It is apparent that with both of these methods the test substance is exposed to the atmosphere.

Most microbiological assays are conducted on a mass scale in that a large variety of samples in varying strengths are run through tests. This then leads to the desire for an automated or semi-automated system for testing substances. The use of cylinders such as stainless steel devices does not lead to an automated system. Hollow cylinders have several disadvantages associated with their use. They are highly unstable on the inoculated nutrient surface and tend to tip easily or at least tend to allow some escape of the test solution at the bottom of the cylinders. Slight jarring of the plate leads to this condition. The cylinders also tend to slide around on the inoculated nutrient surface when the plate is tilted slightly. All of these effects prevent an effective seal of the cylinder to the inoculated nutrient surface. A defective seal results in spillage of the test solution and adversely affects uniform diffusion of the test substance. Furthermore, the cylinders, being relatively expensive, must be washed; and this, in turn, incurs considerable clean-up expense.

Absorbent pads or discs also have several disadvantages in their use such as difficulty of handling, time-consuming operations and the necessity of measurement and transfer of very small volumes of test solution. Many of these disadvantages in both methods present serious problems for mechanization.

The method of this invention overcomes the above disadvantages and leads to a system that may be easily automated. In general, our method comprises the use of inexpensive and disposable plastic receptacles or cups which are filled with the test solution. Petri dishes containing a layer of the inoculated agar composition are inverted over the filled cups causing the cups to adhere to the surface of the agar. The petri dishes are then uprighted to their normal position with the test solution still confined within the inverted cups but in contact with the agar medium.

It is therefore one object of this invention to provide a new and improved method for performing microbiological assays.

Another object of this invention is to provide a new and improved method for performing microbiological assays in an automated manner.

Another object of this invention is to provide a new and improved method which results in increased accuracy for microbiological assays.

Other objects and advantages will be apparent from the following description when read in connection with the drawing in which.

Figure 1:
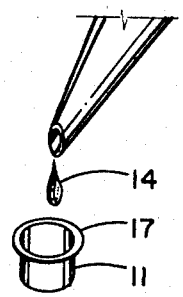
FIG. 1 is a perspective view of a receptacle containing a test solution in accordance with the method of this invention.
Figure 2:
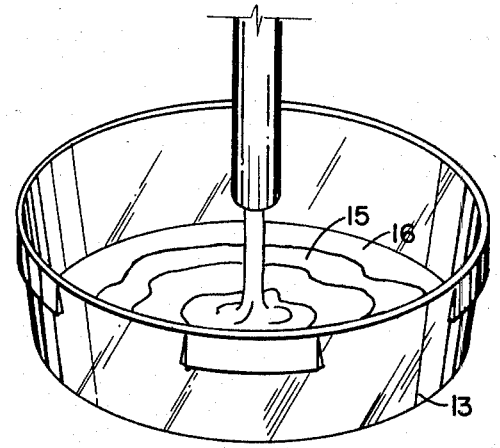
FIG. 2 is a perspective view of a conventional petri dish with a layer of agar composition.
Figure 3:
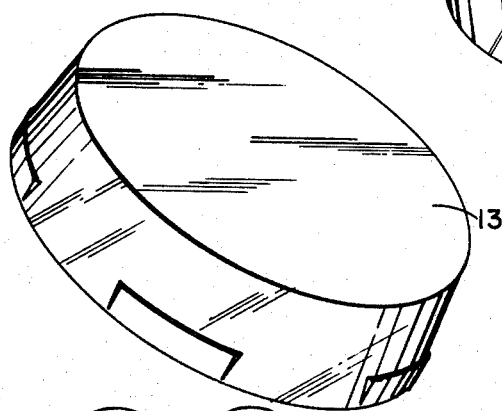
FIG. 3 is a perspective view of the coated petri dish in an inverted position and about to be placed over several of the receptacles.
Figure 4:
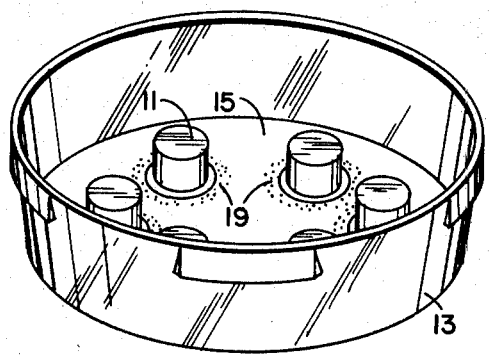
FIG. 4 is a perspective view of a petri dish in an upright position with several receptacles containing the test solution inverted over the agar composition.

Referring to FIG. 1, a plastic receptacle or cup 11 is shown which may be formed from such materials as acetate, butyrate, vinyl and polystyrene. A number of these cups may be formed by a vacuum drawing method well known in the plastics art. Although plastics are preferable from a cost standpoint, it is to be understood that light weight cups formed from other materials such as glass, aluminum, etc., may also be used. In FIG. 2 a conventional petri dish 13 is shown which may also be formed from a plastic material and probably by an injection molding method. Both the cup and dish are inexpensive and may be disposed after a single use.

In performing the method of this invention, an inoculated agar composition 15 may be placed on the bottom surface 16 of the petri dish 13 to form a thin layer. In an automated system a plurality of these dishes may be passed beneath a device for dispensing the agar composition. The dishes are then set aside to cool and the agar composition becomes partially solidified.

Receptacles or cups of the type shown in FIG. 1, which may be less than half an inch in diameter are partially filled with the substance 14 under test. When it is desired to commence the assay a petri dish 13 containing a layer of the agar composition 15 is inverted over the cup containing the test solution 14. Generally, the dish is of such a dimension as to permit it to contain several of the small cups. As the dish with the layer of agar medium 15 is inverted over the cup containing the test solution 14, the cup 11 will adhere to the surface of the agar composition. Although not necessarily essential, the cup may have a flange 17 about the periphery of its open end in order to increase the area of contact between the cup and agar composition, providing a stable support as well as a more effective liquid seal. The dish need not be placed over the cup with any more pressure than is necessary to secure good adherence between the cup and the surface of the agar composition. Although the likelihood is remote, it is essential that the cup not be in complete sealing contact with the bottom surface 16 of the dish inasmuch as this would prevent diffusion of the test substance into an area of the agar composition surrounding the cup.

Once the cup is adhered to the layer of agar in the petri dish, the dish is uprighted and the test solution is drawn by gravity into contact with the agar surface. The test solution is then incubated for a predetermined time. Depending upon the activity of the test substance a zone 19 may form about the perimeter of the cup in the agar composition. When the incubation period has expired, the zone may be measured without removing the cup 11. Once measurements have been taken the petri dish 13 and the cup 11 may be disposed.

It is apparent that in performing the above-described method the test substance is completely isolated from the atmosphere and is not subject to contamination and evaporation. The partially solidified surface of the agar composition 15 causes the cup 11 to be completely stable with little tendency to slide. Thus, the method leads to easy automation inasmuch as the petri dish 13 containing the cups 11 and the test solution 14 may be easily moved by a conveyer device without fear of disturbing the cups.

In comparing this method with other methods it was found that accuracy in results was substantially improved. An assay of the antibiotic neomycin revealed a significant reduction in the standard deviation of the test. The ease in which the test solution may be placed in contact with the agar composition has greatly reduced the cost of assays.

Although only one specific way of performing the method of this invention has been described, it will be apparent to those skilled in the art that other embodiments may be made without departing from the spirit of this invention and the scope of the appended claims.

We claim:
1. In a method of performing a microbiological assay, the steps comprising:
    coating a flat member with a layer of an inoculated nutrient composition,
    placing a test solution into an open-ended receptacle,
    inverting the coated member onto the open end of the receptacle whereby the receptacle adheres thereto,
    and uprighting the coated member with the receptacle containing the test solution lying thereon in inverted position with the test solution in contact with the inoculated nutrient surface.
2. The method of claim 1 in which the flat member comprises a dish with a bottom surface and a peripheral side wall.
3. The method of claim 2 in which the coated layer on the bottom surface of the dish is an inoculated agar composition.
4. The method of claim 3 in which the receptacle is formed from a thin-walled plastic material.
5. The method of claim 4 in which a plurality of receptacles containing the test solution are spaced on the coated bottom surface of the dish in inverted position.
6. The method of claim 5 in which each of the receptacles has a flange about the open end of its side wall.

References Cited

Applied Microbiology, vol. 5, No. 1, pp. 25–33 (1957).

ALVIN E. TANEHOLTZ, *Primary Examiner*.